(12) United States Patent
Puetter et al.

(10) Patent No.: US 6,811,705 B2
(45) Date of Patent: Nov. 2, 2004

(54) WASTEWATER TREATMENT SYSTEM

(75) Inventors: Juergen K. Puetter, Sidney (CA); Steven C. Depoli, Victoria (CA); David J. Featherstonhaugh, Victoria (CA)

(73) Assignee: Hydroxyl Systems Inc., Sidney (CA)

( * ) Notice: Subject to any disclaimer, the term of this patent is extended or adjusted under 35 U.S.C. 154(b) by 200 days.

(21) Appl. No.: 10/078,352

(22) Filed: Feb. 21, 2002

(65) Prior Publication Data

US 2002/0117458 A1 Aug. 29, 2002

(30) Foreign Application Priority Data

Feb. 26, 2001 (CA) .............................................. 2337975

(51) Int. Cl.[7] .............................. C02F 1/24; C02F 1/78; C02F 9/02; C02F 9/04; C02F 9/12
(52) U.S. Cl. ....................... 210/703; 210/706; 210/748; 210/760; 210/205; 210/221.2; 210/195.1
(58) Field of Search ................................ 210/703, 706, 210/760, 748, 205, 221.2, 195.1

(56) References Cited

U.S. PATENT DOCUMENTS

| | | | |
|---|---|---|---|
| 3,822,786 A | 7/1974 | Marschall | |
| 3,945,918 A | * 3/1976 | Kirk | ............. 210/703 |
| 4,053,399 A | 10/1977 | Donnelly et al. | |
| 4,156,648 A | 5/1979 | Kuepper | |
| 4,197,200 A | 4/1980 | Alig | |
| 4,214,887 A | 7/1980 | van Gelder | |
| 4,233,152 A | 11/1980 | Hill et al. | |
| 4,255,262 A | * 3/1981 | O'Cheskey et al. | ..... 210/221.2 |
| 4,961,857 A | 10/1990 | Ottengraf et al. | |
| 5,053,140 A | * 10/1991 | Hurst | ......................... 210/704 |
| 5,178,755 A | 1/1993 | LaCrosse | |
| 5,180,499 A | * 1/1993 | Hinson et al. | .............. 210/706 |
| 5,256,299 A | * 10/1993 | Wang et al. | ................. 210/664 |
| 5,308,480 A | * 5/1994 | Hinson et al. | ........... 210/195.1 |

FOREIGN PATENT DOCUMENTS

| | | |
|---|---|---|
| EP | 261822 | 3/1988 |
| JP | 56-141891 | * 11/1981 |
| JP | 2000-051874 | * 2/2000 |
| WO | WO 93/24413 | 12/1993 |
| WO | WO 98/51618 | 11/1998 |

* cited by examiner

Primary Examiner—Thomas M. Lithgow
(74) Attorney, Agent, or Firm—Anissimoff & Associates; Robert A. H. Brunet

(57) ABSTRACT

A wastewater treatment system for use on marine vessels or land-based applications treats wastewater by solids separation and oxidation. The system includes a solids separation tank, an oxidation tank having a plurality of chambers and a fluid circuit for re-circulating treated wastewater into the solids separation tank and oxidation tank for further treatment. An ozone generator produces ozone which is dissolved in the treated wastewater in the re-circulating fluid conduit and is used for the solids separation and oxidation processes. The treated wastewater is periodically discharged into the environment.

13 Claims, 2 Drawing Sheets

WASTEWATER TREATMENT SYSTEM

BACKGROUND OF THE INVENTION

1. Field of the Invention

The invention pertains to systems for treating wastewater and, more particularly, to an apparatus and method for treating wastewater on marine vessels, or land-based systems, so the effluent can safely be released into the environment.

2. Description of the Prior Art

Wastewater generated on marine vessels such as ships, ferries and pleasure craft should be treated before it is released into the marine environment to prevent or reduce environmental contamination. This wastewater can include waste from toilets, sometimes referred to as "blackwater", waste from showers, sinks, laundry machines, galleys and the like, sometimes referred to as "greywater," and bilge water. In many jurisdictions, the standards for wastewater effluent discharge from marine vessels is prescribed by government regulation. The standards may limit the discharge of suspended solid, contaminants affecting BOD (biochemical oxygen demand) and pathogens. Hence, effluent treatment may involve suspended solids removal, BOD reduction and disinfection.

Wastewater treatment systems for marine applications typically include the use of disinfecting chemicals such as chlorine or the use of microbiological oxidation. Both systems have disadvantages. Chlorine and similar disinfecting chemicals are themselves environmental contaminants and may form harmful byproducts, such as various chlorinated compounds. They require hazardous chemical storage on the vessel. Their use in marine applications is prohibited in some jurisdictions. Chlorination will only achieve disinfection of the wastewater. Treatment by biological digestion is effective in land-based sewage treatment but is not well suited for marine applications for various reasons. These include the slowness of the process and its sensitivity to influent substances such as surfactants and to changes in salinity, temperature and flow volumes. Biological treatment systems have large footprint requirements. On start-up, time is required for development of the biological growth within the treatment apparatus; this can take several days, resulting in effluent that does not meet discharge limits. The resultant effluent from a biological reactor may still require the removal of suspended solids and disinfection.

It is known that ozone can be used for oxidizing the contaminants in wastewater and for disinfection. For example, U.S. Pat. No. 4,197,200 (Alig) and U.S. Pat. No. 4,053,399 (Donnelly et al.) describe wastewater treatment systems in which ozone gas is employed. However, the use of diffusers to introduce the gas into wastewater will not achieve the micro-bubble size for effective solids removal in dissolved gas flotation nor the efficient reduction of BOD via oxidation of the contaminants. In addition, the diffusers can plug with solids during system shutdown, rendering system maintenance difficult.

SUMMARY OF THE INVENTION

The invention provides an apparatus and method for treating wastewater (which can include blackwater, greywater and/or bilge water in marine and land-based applications) that uses ozone as an oxidizing agent and does not rely on microbiological oxidation or involve the use of any additional disinfecting chemicals. The system effectively reduces the BOD, total suspended solids (TSS) and fecal coliform count of the discharged water so it can be released into the environment to meet effluent regulations. The system includes a solids separation tank, an oxidation tank preferably having a plurality of chambers and a fluid circuit for re-circulating treated wastewater into the oxidation tank and, preferably, also into the solids separation tank, for further treatment. Suspended solids are separated by dissolved gas flotation and the wastewater is oxidized by ozone that is dissolved in the treated wastewater (effluent) and re-circulated through the treatment apparatus. Although solids separation takes place mainly in the solids separation tank it will also take place in the oxidation tank. Oxidation takes place in all the chambers. Advantageously, the introduction of ozone into the system as a gas which is dissolved in the effluent and is subsequently released from solution in the reaction vessels via nozzles to form a gas used for flotation and oxidation avoids the use of diffusers to introduce ozone as a gas. A high degree of BOD removal is achieved in this system. The ozone used in the system is generated on the vessel (in the case of marine applications) using electricity produced by the vessel's engines, so no transporting or storage of tanks of chemicals is required. In the case of difficult to oxidize chemicals such as certain surfactants and oil, advanced oxidation technologies may be included. Advanced oxidation technologies are those that produce hydroxyl radicals which are very aggressive oxidants. One means of producing these radicals is via the exposure of ozone to ultraviolet light.

According to the present invention, there is provided an apparatus for treating wastewater comprising: a wastewater inlet conduit; a solids separation tank to receive wastewater from the inlet conduit, for the separation of solids from liquid in the wastewater; an oxidation tank in fluid communication with the solids separation tank to receive liquid from the solids separation tank; a liquid outlet conduit from the oxidation tank to conduct liquid from the oxidation tank; a source of gas comprising ozone; means for dissolving the gas comprising ozone in liquid from the liquid outlet conduit; a re-circulating circuit for conducting the liquid with dissolved gas comprising ozone to the solids separation tank and the oxidation tank; discharge means for discharging the liquid with dissolved gas comprising ozone into the solids separation tank and oxidation tank, whereby the dissolved gas comprising ozone forms gas bubbles in the solids separation tank and oxidation tank; and a liquid discharge conduit to discharge treated liquid from the apparatus.

In accordance with another aspect of the invention, there is provided an apparatus for treating sewage comprising: a wastewater inlet conduit; a solids separation tank to receive the wastewater from the inlet conduit, with gas distribution means therein for the separation of solids from liquid in the wastewater by gas flotation; an oxidation tank in fluid communication with the solids separation tank to receive liquid from the solids separation tank; a liquid outlet conduit from the oxidation tank to conduct liquid from the oxidation tank; a source of gas comprising ozone; means for dissolving the gas comprising ozone in liquid from the liquid outlet conduit; a re-circulating circuit for conducting the liquid with dissolved gas comprising ozone to the oxidation tank; discharge means for discharging the liquid with dissolved gas comprising ozone into the oxidation tank, whereby the dissolved gas comprising ozone forms gas bubbles in the oxidation tank; and a liquid discharge conduit to discharge treated liquid from the apparatus.

In accordance with yet another aspect of the invention, there is provided a method for treating wastewater comprising the steps of: providing a treatment system comprising a solids separation tank, an oxidation tank and a liquid flow circuit whereby liquid flows from the solids separation tank into the oxidation tank, out of the oxidation tank and is reintroduced into the solids separation tank and the oxidation tank; dissolving a gas comprising ozone into the liquid in the liquid flow circuit after the liquid exits from the oxidation tank; introducing wastewater to be treated into the solids separation tank; separating solids from liquid in the wastewater in the solids separation tank; allowing the liquid from the solids separation tank to pass into the oxidation tank; introducing the liquid with dissolved gas comprising ozone into the liquid in the oxidation tank and allowing the gas comprising ozone to form bubbles in the liquid in the oxidation tank and cause oxidation of substances in the liquid in the oxidation tank; and removing treated liquid from the treatment system for discharge to the environment.

In accordance with yet another aspect of the invention, there is provided a method for treating wastewater comprising the steps of: providing a treatment system comprising a solids separation tank, an oxidation tank and a liquid flow circuit whereby liquid flows from the solids separation tank into the oxidation tank, out of the oxidation tank and is reintroduced into the oxidation tank; dissolving a gas comprising ozone into the liquid in the liquid flow circuit after the liquid exits from the oxidation tank; introducing wastewater to be treated into the solids separation tank; separating solids from liquid in the wastewater in the solids separation tank by means of gas flotation; allowing the liquid from the solids separation tank to pass into the oxidation tank; introducing the liquid, with dissolved gas comprising ozone into the liquid in the oxidation tank and allowing the gas comprising ozone to form bubbles in the liquid in the oxidation tank and cause oxidation of substances in the liquid in the oxidation tank; and removing treated liquid from the treatment system for discharge to the environment.

PREFERRED EMBODIMENT

Figure 1:
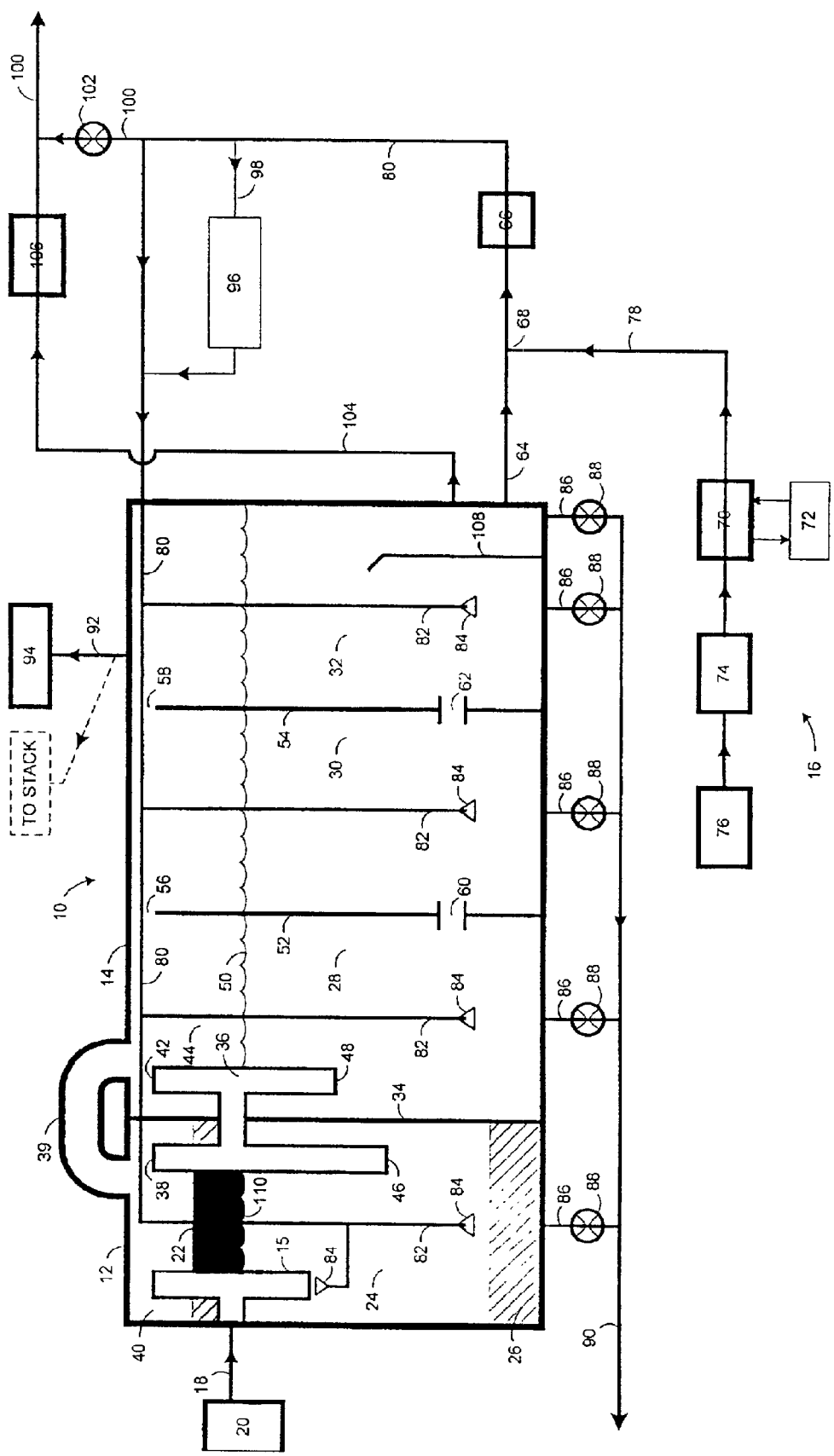
FIG. 1 is a schematic view of a wastewater treatment apparatus according to the invention.

Wastewater treatment apparatus 10 comprises, in general terms, a solids separation tank 12, oxidation tank 14, ozone source 16, ozone distribution devices or nozzles 84, optional ozone destructor 94, optional advanced oxidation system 96, solids removal system (not shown) and associated conduits, valves and pumps. The apparatus provides for the continuous re-circulation of a portion of the treated wastewater back into the apparatus for further treatment. Alternatively, the system can be configured for a single pass mode operation.

Inlet conduit 18 conveys wastewater from a wastewater source 20 which, on a ship, can be the toilets, sinks, showers, laundry, galley, bilge, etc. of the ship, into solids separation tank 12. Option-ally, a grinder (not shown) can be provided in conduit 18 to grind solid matter in the wastewater prior to its entry into the solids separation tank. Likewise, a screen can optionally be provided in conduit 18 to remove solids from the influent. An optional holding tank can also be provided between the wastewater source 20 and the solids separation tank.

The wastewater enters the solids separation tank 12 through T-shaped receiving duct 15, which is open at its upper and lower ends in the solids separation tank. The incoming wastewater is immediately contacted with ozone from nozzle 84 located just below the lower end of the T-shaped receiving duct. A dissolved gas flotation process is carried out in the solids separation tank 12, as described below, to effect substantial separation of suspended solids in the raw wastewater. This process forms a solids cap 22 floating on the liquid portion 24 of the wastewater. This cap will be at least partly digested by the gas which consists mainly of oxygen and ozone. This digestive action will result in a reduced rate of solids accumulation in comparison with standard dissolved air flotation. The cap may be removed on an intermittent or continuous basis. Heavy solids that are not floated to the surface sink to the bottom of the solids separation tank 12, forming a mass 26.

Oxidation tank 14 preferably comprises three chambers, namely inlet chamber 28, intermediate chamber 30 and outlet chamber 32. The oxidation tank may have fewer or more than three chambers. The solids separation tank and oxidation tank are preferably constructed as a single, integral unit. Inlet chamber 28 is separated from solids separation tank 12 by wall 34. Conduit 36 passes through wall 34, permitting the flow of both gas and liquid from the solids separation tank into chamber 28 of the oxidation tank 14. Conduit 36 is a generally H-shaped structure, having an upper duct 38 in the solids separation tank that extends above the solids cap 22 and opens into headspace 40 in the solids separation tank, and an upper duct 42 that opens into the headspace 44 in chamber 28. A conduit 39 is also provided between tank 12 and chamber 28 as a safety feature in the event that duct 38 becomes covered or blocked with solids. Gas can accordingly flow between the respective headspaces. Conduit 36 also has lower duct 46 in the solids separation tank and lower duct 48 in inlet chamber 28, opening below the surface 50 of the liquid 24 and accordingly permitting the flow of liquid (i.e. wastewater) from the solids separation tank into chamber 28. In addition, conduit 36 maintains a constant operating level in the solids separations tank 12.

Intermediate chamber 30 of the oxidation tank 14 is separated from inlet chamber 28 and from outlet chamber 32 by walls 52, 54 respectively. Openings 56, 58 are provided in walls 52, 54 respectively near the top of the chambers, above liquid level 50, to permit the flow of gas in the headspace between the chambers 28, 30, 32. Likewise, openings 60, 62 are provided in walls 52, 54 respectively, below liquid level 50, to permit the flow of liquid from inlet chamber 28, through intermediate chamber 30 and into outlet chamber 32. Preferably, openings 60 and 62 are arranged near the opposite sides of the oxidation tank (i.e. in and out of the plane of the paper in the view of FIG. 1 to provide a sinuous flow path for liquid through the oxidation tank. Wall 108 provides one final over and under pattern prior to liquid exiting the tank through conduits 64 and 104.

Liquid outlet conduit 64 leads from the lower part of outlet chamber 32 to pump 66. Conduit 64 may also include a strainer (not shown) to protect the pump. Conduit 64 includes T-junction 68 to receive gas containing ozone from ozone source 16. The gas may be introduced at ambient pressure, at elevated pressure or reduced pressure. The pump 66 should be capable of pressurizing water with entrained gas without causing cavitation or vapor lock. Suitable air handling pumps include regenerative turbine and special multi-phase centrifugal pumps which can handle limited air injection (10–20% v/v).

An ozone generator is required capable of generating a high percentage of ozone. The preferred gas feed should contain a high level of oxygen. The ozone source 16 comprises ozone generator 70 with associated chiller 72, or another appropriate cooling device, oxygen concentrator 74 and air compressor 76. Ozone generator 70 is a preferably a corona discharge-type generator. The feed gas used for ozone generation is oxygen produced by concentrator 74, which is preferably a pressure swing absorption-type oxygen concentrator. Preferably, the output of the concentrator is about 95% oxygen. The air compressor 76 supplies compressed air to the concentrator. It is to be understood that the concentrator can include an internal compressor rather than a separate unit. Further, the ozone generator 70 can produce ozone without any oxygen concentrator, but the concentrator permits a smaller capacity ozone generator to be used, which is advantageous for marine applications. The output of ozone generator 70 is gas comprising about 6–18% ozone and the balance oxygen, with small quantities of nitrogen and the other gasses normally present in air. The gas containing ozone passes through conduit 78 and T-junction 68, where it mixes with the liquid stream in conduit 64 from the oxidation tank, and into pump 66.

Pump 66 mixes and pressurizes the liquid and gas mixture and dissolves most of the gas in the liquid. Alternatively, instead of a single re-circulation circuit, some or all of the oxidation tank chambers may be fitted with dedicated re-circulation systems complete with ozone addition. This would give additional process control, however, at a higher cost. Re-circulation conduit 80 conducts the liquid with gas from the pump 66 back into the solids separation tank and the oxidation tank. Conduit 80 passes through the headspace in the oxidation tank and through wall 34 to the solids separation tank and into a downwardly-extending conduit 82 in the solids separation tank 12 and in each chamber of the oxidation tank 14. Optionally, two or more conduits 82 can be provided in the solids separation tank and in each chamber of the oxidation tank. Conduits 82 end in a discharge means or nozzle 84 below the liquid level in the solids separation tank and the oxidation tank. The liquid and dissolved gas in re-circulation conduit 80 enters the liquid in the solids separation tank and the oxidation tank through nozzles 84. The pressure in the re-circulation conduit 80, caused by pump 66, is higher than the pressure in the solids separation tank and the oxidation tank. Preferably, the pressure in the re-circulation conduit 80 is about 100 psi and that in the solids separation tank and oxidation tank about atmospheric. When the liquid with dissolved gas exits the nozzles 84, much of the dissolved gas with ozone accordingly comes out of solution and forms micro gas bubbles. The appearance of these gas bubbles resembles the formation of smoke clouds. The bubbles should be uniformly distributed throughout the tanks with minimum large bubble formation. Some dissolved gas remains dissolved. Thus, a mixture of treated wastewater (effluent), dissolved gas with ozone and gas bubbles exits the nozzles 84 into the solids separation tank and the chambers of the oxidation tank. In the solids separation tank 12, the bubbles effect separation of suspended solids by gas flotation, a separation method known in the art and sometimes referred to as dissolved air flotation (DAF). The suspended solids are floated to the top of the liquid. In addition to effecting flotation in the solids separation tank, the ozone oxidizes organic compounds in the wastewater. The ozone and oxygen effects protein stripping and also oxidizes organic compounds in the solids cap 22, thereby reducing the volume of solids 22 for separation. Solids 26 that settle on the bottom of the solids separation tank are removed from the tank during periodic maintenance.

Figure 2:
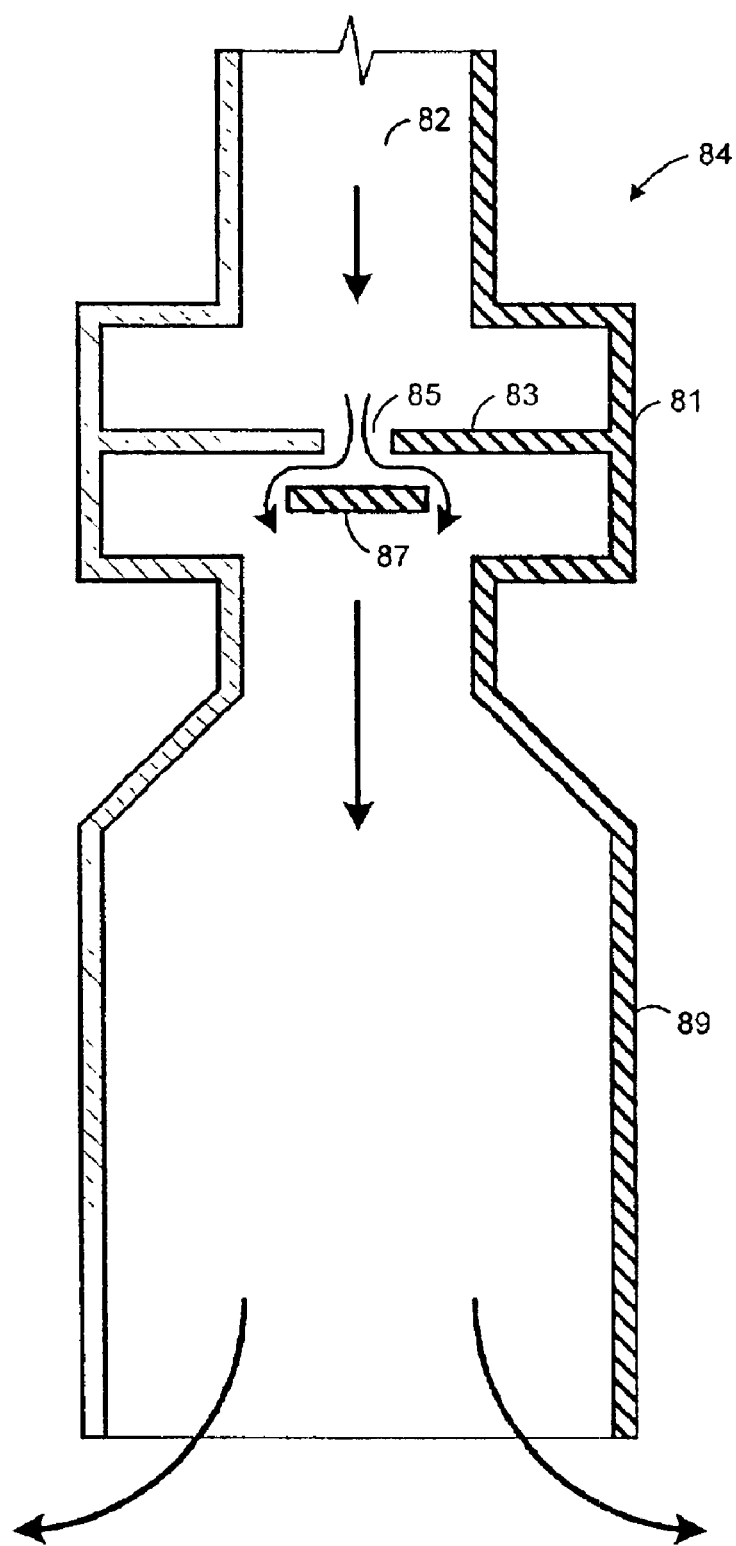
FIG. 2 is a cross-sectional view of a discharge nozzle.

Referring to FIG. 2, in a preferred configuration nozzle 84 consists of a pipe union 81 containing a plate 83 with a small hole 85 in it. Attached to this plate 83 on the discharge side (by means of legs, not shown in this drawing) is a baffle plate 87 having a smaller diameter than the discharge pipe 82. The distance between these two plates is slightly larger than the diameter of the hole 85. For example, the plate 83 in a one inch union 81 would have a $9/64$ inch hole and a baffle plate 87 about $3/4$ inch in diameter placed at about $3/32$ inch from the plate 83. The shape of the baffle plate can be round or more complex. The stream of effluent with dissolved gas hitting the baffle plate generates micro-bubbles. The impact with which these bubbles hit the plate may result in a phenomena called cavitation which will enhance the oxidation process by creating very aggressive oxidation species. A variety of stacks 89 can be attached to this assembly. The stack promotes uniform distribution of the micro-bubbles in the tank. More than one nozzle 84 can be placed on a single pipe.

Various other configurations of discharge nozzle can be employed, provided that they discharge a cloud of micro-bubbles of gas into the wastewater and enhance the oxidation via cavitation. Such nozzles may be found in use in commercially available dissolved air flotation equipment.

Within the oxidation tank chambers, the dissolved ozone and ozone micro-bubbles exiting nozzles 84 cause oxidation of organic compounds in the wastewater 24 within the oxidation tank. The oxidation process causes reduction of BOD and TSS and disinfects the wastewater.

Any suspended solids in the wastewater that were not separated out in the solids separation tank and that passed into the oxidation tank are there subject to flotation and oxidation. Any floating cap of solids in the oxidation tank or solids that settle to the bottom of the oxidation tank can be periodically removed. A drain hole is provided in the bottom of the solids separation tank and each of the oxidation tank chambers. Conduits 86, which include closeable discharge valves 88, lead from the drain holes to conduit 90, to permit removal of solids 26 and emptying of the solids separation tank and the oxidation tank. Such removal and emptying is performed as part of the periodic maintenance of the apparatus 10, for example once every few months, and is not part of the regular and substantially continuous operation of the apparatus.

It is preferable for the efficiency of the oxidation process to introduce into the apparatus 10 more ozone than will be fully consumed by oxidation, causing an excess of ozone in the headspace of the solids separation tank and oxidation tank. Vent 92 is provided in the top of the oxidation tank to conduct the ozone to an ozone destructor 94. Preferably, destructor 94 is a thermal destructor unit. The exhaust gases from the destructor are vented to the atmosphere. If desired, rather than destroy the excess ozone, in marine applications it can be fed to the exhaust stack of the vessel where it can be used to oxidize compounds in the exhaust and thereby reduce emissions. Alternatively, the ozone could be reused in the treatment system.

When the wastewater to be treated in apparatus 10 includes greywater, which contains surfactants, or includes bilge water containing oil and grease, it is desirable to include an advance oxidation technology in the apparatus. This can be accomplished, for example, by an ultraviolet radiator acting on the ozone to produce hydroxyl radicals. These radicals are capable of reacting with and breaking down surfactants or other difficult to oxidize organic chemicals. To incorporate this optional feature, conduit 98 forms a parallel loop on conduit 80, conducting part of the flow in conduit 80 through ultraviolet radiator 96 and back to re-circulation conduit 80. Part of the re-circulating liquid with dissolved gas containing ozone is passed through the radiator. Valves (not shown) are provided to regulate the amount of flow through conduit 98.

Discharge conduit 100 leads from re-circulation conduit 80 to permit discharge of treated wastewater from the apparatus. Discharge valve 102 is provided in discharge conduit 100. To discharge treated wastewater, discharge valve 102 is opened, permitting pump 66 to pump liquid out through discharge conduit 100. The effluent can be discharged from conduit 100 directly into the marine environment. Preferably, discharge valve 102 is an automated solenoid valve that opens and closes when the liquid level in the oxidation tank rises or falls respectively to pre-set heights.

Preferably, a backup discharge system is provided to ensure that the capacity to discharge the oxidation tank is always maintained. Secondary discharge conduit 104 leaves from outlet compartment 32 of the oxidation tank to secondary discharge pump 106, capable of pumping liquid out of the oxidation tank through discharge conduit 100. It is contemplated that secondary discharge pump 106 is actuated when the liquid in the oxidation tank rises above the normal discharge level handled by the primary discharge system. Optionally, pump 106 can be used as the primary discharge pump, with pump 66 and discharge valve 102 providing a backup discharge system.

In use, pump 66 is continuously pumping effluent for re-circulation through the system. Influent, i.e. wastewater to be treated, flows into the solids separation tank 12. Solids are separated as described above by gas flotation and some oxidation occurs. Liquid in the solids separation tank is displaced as more wastewater flows in, causing the liquid to flow through conduit 36 into the first compartment 28 of the oxidation tank. There, oxidation occurs and some suspended solids that may have passed through the solids separation tank are separated out. The liquid passes through opening 60 into the intermediate chamber 30 where further oxidation (and solids separation, if necessary) occurs, and then through opening 62 into outlet compartment 32 where the same process occurs. The wastewater exits the oxidation tank through conduit 64, is ozonated in pump 66 and is pumped through re-circulation conduit 80 for re-circulation into the solids separation tank and oxidation tank for further oxidizing treatment. Since in-flowing wastewater through inlet conduit 18 causes a displacement in the liquid level in the solids separation tank and a subsequent rise in level in the oxidation tank, the discharge valve 102 is periodically opened, causing treated liquid to be discharged from the apparatus through discharge conduit 100.

EXAMPLE

A treatment apparatus was provided for marine blackwater as depicted in FIG. 1 in which the combined volume of the solids separation tank and oxidation tank is 20 cubic meters. The volume of wastewater influent was 50 cubic meters per day. The retention time of wastewater within the apparatus was approximately four hours. The use of the apparatus reduced the TSS of the sewage from 1,400 mg/l to less than 20 mg/l, the BOD from 650 mg/l to less then 30 mg/l and the fecal coliform count to less then 100 MPN/100 ml.

Although it is preferred that the solids separation tank 12 include a conduit 82 and nozzle 84 for the introduction of ozonated effluent, in an alternative embodiment ozonated effluent is introduced only into the oxidation tank. A separate air inlet and diffuser or other gas distribution means is then provided in solids separation tank 12 to effect flotation and solids separation in that tank by means of the introduction of air bubbles.

The apparatus and method of the invention have been described above primarily in relation to applications on marine vessels. However, the method and apparatus is equally applicable to land-based wastewater treatment systems.

The preferred embodiments described above are intended to illustrate the principles of the invention, but not to limit its scope. Various other embodiments and modifications to these preferred embodiments may be made by those skilled in the art without departing from the scope of the following claims.

Having described the invention, what is claimed is:

1. A method for treating wastewater comprising the steps of:
   a) providing a treatment system comprising: a solids separation tank; an oxidation tank comprising a plurality of chambers including an inlet chamber operatively connected to said solids separation tank and an outlet chamber from which liquid exits from said oxidation tank; and, a liquid flow circuit whereby liquid flows from said solids separation tank into said oxidation tank, out of said oxidation tank and is reintroduced into said solids separation tank and said oxidation tank;
   b) dissolving a gas comprising ozone into said liquid in said liquid flow circuit after said liquid exits from said oxidation tank;
   c) introducing wastewater to be treated into said solids separation tank;
   d) separating solids from liquid in said wastewater in said solids separation tank;
   e) allowing said liquid from said solids separation tank to pass into said oxidation tank;
   f) introducing said liquid with dissolved gas comprising ozone into said liquid in said oxidation tank and allowing said gas comprising ozone to form bubbles in said liquid in said oxidation tank and cause oxidation of substances in said liquid in said oxidation tank;
   g) introducing said dissolved gas comprising ozone into each of said chambers and allowing said liquid to flow from said inlet chamber, through any intermediate chambers and into said outlet chamber; and,
   h) removing treated liquid from said treatment system for discharge to the environment.

2. A method according to claim 1 wherein said step of separating solids from liquid comprises introducing said liquid with dissolved gas comprising ozone into said solids separation tank and allowing said dissolved gas comprising ozone introduced into said solids separation tank to form bubbles in said wastewater, thereby effecting separation of said solids in said wastewater by flotation and causing oxidation of substances in said wastewater.

3. A method according to claim 1 wherein step (f) comprises directing said liquid with dissolved gas comprising ozone through an orifice in a plate and against a baffle plate spaced from said orifice.

4. A method according to claim 1 further comprising the step of removing any excess ozone from said treatment system.

5. A method according to claim 1 further comprising the step of producing said gas comprising ozone.

6. A method according to claim 1 further comprising the step of periodically removing said separated solids from said solids separation tank.

7. A method according to claim 1 further comprising the step of irradiating at least part of said liquid with said dissolved gas comprising ozone with ultraviolet light to produce hydroxyl radicals.

8. A method for treating wastewater comprising the steps of:
   a) providing a treatment system comprising: a solids separation tank; an oxidation tank comprising a plurality of chambers including an inlet chamber operatively connected to said solids separation tank and an outlet chamber from which liquid exits from said oxidation tank; and, a liquid flow circuit whereby liquid flows from said solids separation tank into said oxidation tank, out of said oxidation tank and is reintroduced into said oxidation tank;
   b) dissolving a gas comprising ozone into said liquid in said liquid flow circuit after said liquid exits from said oxidation tank;
   c) introducing wastewater to be treated into said solids separation tank;
   d) separating solids from liquid in said wastewater in said solids separation tank by means of gas flotation;
   e) allowing said liquid from said solids separation tank to pass into said oxidation tank;
   f) introducing said liquid, with dissolved gas comprising ozone into said liquid in said oxidation tank and allowing said gas comprising ozone to form bubbles in said liquid in said oxidation tank and cause oxidation of substances in said liquid in said oxidation tank;
   g) introducing said dissolved gas comprising ozone into each of said chambers and allowing said liquid to flow from said inlet chamber, through any intermediate chambers and into said outlet chamber; and,
   h) removing treated liquid from said treatment system for discharge to the environment.

9. A method according to claim 8 wherein step (f) comprises directing said liquid with dissolved gas comprising ozone through an orifice in a plate and against a baffle plate spaced from said orifice.

10. A method according to claim 8 further comprising the step of removing any excess ozone from said treatment system.

11. A method according to claim 8 further comprising the step of producing said gas comprising ozone.

12. A method according to claim 8 further comprising the step of periodically removing said separated solids from said solids separation tank.

13. A method according to claim 8 further comprising the step of irradiating at least part of said liquid with said dissolved gas comprising ozone with ultraviolet light to produce hydroxyl radicals.

* * * * *